UNITED STATES PATENT OFFICE.

WALTER S. ROCKEY AND HILLIARY ELDRIDGE, OF NEW YORK, N. Y.

PROCESS FOR MANUFACTURING METALLIC MANGANESE AND CALCIUM FLUORID.

1,007,734. Specification of Letters Patent. Patented Nov. 7, 1911.

No Drawing. Application filed September 17, 1910. Serial No. 582,430.

*To all whom it may concern:*

Be it known that we, WALTER S. ROCKEY and HILLIARY ELDRIDGE, citizens of the United States, and both residing at New York city, in the county of New York and State of New York, have invented certain new and useful Improvements in the Process for Manufacturing Metallic Manganese and Calcium Fluorid, of which the following is a full, clear, and exact specification.

Our invention relates to the process of manufacturing metallic manganese and calcium fluorid, and the object of our invention is to provide a process of manufacturing metallic manganese and calcium fluorid by the reduction of manganese fluorid with calcium or the calcium of calcium carbid.

We provide a suitable refractory crucible or tilting hearth composed of material neutral to the chemical action of the ingredients to be treated, which may be made of material such as magnesite. We then place in said crucible a mixture of manganese fluorid and calcium fluorid, the latter acting as a flux, and fuse the same, and into this fused and liquid bath we place a proportionate amount of calcium carbid sufficient to reduce the manganese fluorid present, and then cover the crucible or tilting hearth to exclude as much of the atmosphere as possible. The calcium of the calcium carbid abandons the carbon with which it was in combination and combines with the fluorin of the manganese fluorid, thus forming calcium fluorid and freeing metallic manganese, which on account of its superior gravity settles to the bottom of the crucible. The chemical equation which represents the reaction taking place, is as follows:

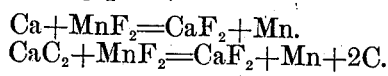

$$Ca + MnF_2 = CaF_2 + Mn.$$
$$CaC_2 + MnF_2 = CaF_2 + Mn + 2C.$$

The carbon of the calcium carbid which is also set free by the reaction, on account of its lesser gravity floats upward to the surface of the molten and liquid calcium fluorid and can be removed by skimming and thus separated from the molten calcium fluorid. The molten manganese and calcium fluorid can then be poured out or drawn off from the receptacle, and thus separated, or they may be poured out together into molds, the fluorid floating on the top of the manganese and serving as a flux to prevent the oxidation of same; or the molten manganese and calcium fluorid can be left to cool in the crucible and then dropped out of the receptacle by upsetting the same and then separating the ingot of manganese from the calcium fluorid mechanically.

We can use metallic calcium for the reduction instead of calcium carbid and in this event the calcium must be mixed with dry manganese fluorid with or without dry calcium fluorid and placed in the crucible and covered to exclude the air, and then heat to cause the reaction which is similar to the reaction already described when calcium carbid is used with the exception that no carbon has to be accounted for. One object of using calcium carbid is to reduce the violent action that results when metallic calcium is used.

We may place all of the ingredients together in the crucible and heat them until the desired result is accomplished, or we may add the reducing agent after the fluorids have been melted together. The calcium of the calcium carbid acts as the reducing agent in the same manner as the metallic calcium, since the carbon from the calcium carbid does not enter into the chemical combination but separates from the calcium and floats to the top of the ingredients.

Having thus described our invention what we claim as new is:

1. The process of manufacturing metallic manganese and calcium fluorid which consists in heating a mixture of manganese fluorid and metallic calcium until chemical combination takes place and metallic manganese and calcium fluorid are formed and separate from each other.

2. The process of manufacturing metallic manganese and calcium fluorid which consists in heating a mixture of manganese fluorid, calcium fluorid and metallic calcium, until chemical combination takes place and metallic manganese and calcium fluorid are formed and separate from each other.

3. The process of manufacturing metallic manganese and calcium fluorid which consists in heating a mixture of manganese fluorid, calcium fluorid and metallic calcium, until chemical combination takes place and metallic manganese and calcium fluorid are formed and separate from each other, and then cooling said manganese beneath said fluorids.

4. The process of manufacturing metallic manganese and calcium fluorid which consists in heating a mixture of manganese fluorid and metallic calcium until chemical combination takes place and metallic manganese and calcium fluorid are formed and separate from each other, and then cooling said manganeses beneath said fluorid.

5. The process of manufacturing metallic manganese and calcium fluorid which consists in heating manganese fluorid and calcium fluorid together in the presence of a substance containing calcium which is the reducing agent until chemical combination takes place and metallic manganese and calcium fluorid are formed and separate from each other.

6. The process of manufacturing metallic manganese and calcium fluorid which consists in heating together manganese fluorid, calcium fluorid, and a substance containing calcium, the calcium of which serves as a reducing agent until chemical reaction takes place and metallic manganese and calcium fluorid are formed and separate from each other, and then cooling the manganese beneath the surface of said fluorids.

7. The process of manufacturing metallic manganese and calcium fluorid which consists in heating a mixture of manganese fluorid and a substance containing calcium, the calcium of which serves as a reducing agent until chemical combination takes place and metallic manganese and calcium fluorid are formed and separate from each other.

In testimony whereof, we affix our signatures, in presence of two witnesses.

WALTER S. ROCKEY.
HILLIARY ELDRIDGE.

Witnesses:
CHAS. R. BALDWIN,
G. F. QUACKENBUSH.